Aug. 6, 1935.  W. A. BURGESS  2,010,687
BALANCING DEVICE FOR POLISHING WHEELS AND THE LIKE
Filed April 13, 1934
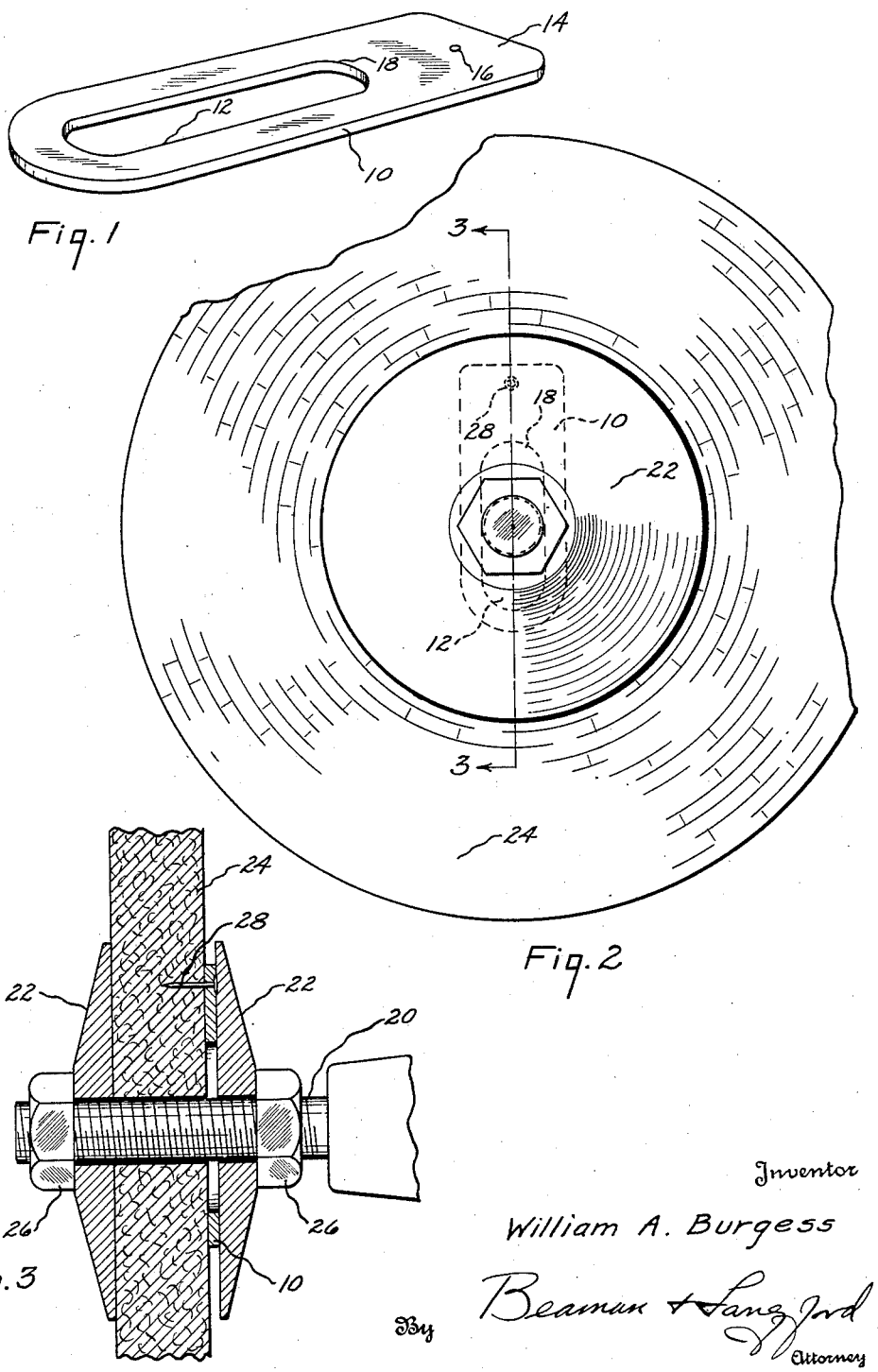
Inventor
William A. Burgess
By Beaman + Langford
Attorney Patented Aug. 6, 1935

2,010,687

UNITED STATES PATENT OFFICE 2,010,687

BALANCING DEVICE FOR POLISHING WHEELS AND THE LIKE

William A. Burgess, Jackson, Mich.

Application April 13, 1934, Serial No. 720,499

8 Claims. (Cl. 51—169)

The present invention relates to improvements in balancing devices for rotatable bodies, being particularly adapted for the balancing of unbalanced force in rapidly rotated machine parts and tools such as, for example, polishing wheels, grinding wheels, fly wheels, etc.

Heretofore innumerable balancing devices have been developed for balancing polishing wheels and the like, as is exemplified by the patent to Nichols No. 1,218,689. These devices, for the most part, have been expensive and cumbersome and require in their installation some special form of attachment or special adapter. As a result, up to the present time, none of such devices have experienced any extensive adaption and very crude and relatively dangerous methods and means are being employed in well equipped plants by the operators for balancing rapidly rotated machine tools, particularly polishing wheels. For example, it is a common practice for an operator to balance a polishing wheel by nailing or otherwise affixing lead weights or washers to the side of the wheel at points spaced from the axis of rotation. It is not at all an uncommon occurrence to have such weights become loosened during the operation of the wheel and fly off causing serious injury.

It becomes the primary object of the present invention to provide an inexpensive, compact balancing device, which may be readily associated with a rotatable body to quickly and accurately balance the same, which requires no special form of attachment or adapter in its installation, and which can not fly off even in the event it becomes loosened and its balancing effect perhaps impaired.

Other objects and advantages residing in the arrangement, combination and construction of parts will become apparent from the detailed description to follow. The invention is clearly defined in the appended claims which are intended to cover all such changes and modifications of the herein illustrated form of the invention as fall within the scope thereof.

In the drawing, wherein a preferred form of the invention is illustrated as employed in connection with a polishing wheel, Fig. 1 is a perspective view of the balancing device, Fig. 2 is a side elevation of a polishing wheel with the balancing device shown in position, and Fig. 3 is a partial sectional view taken on line III—III of Fig. 2.

Generally, the present invention comprises a balancing device in the form of a washer-like member having an opening therein to receive the shaft, arbor or spindle upon which the rotatable body is mounted. Preferably, the balancing device takes the form of an elongated and/or irregular shaped washer-like member having an elongated slot therein of substantially the same width as the diameter of the shaft, arbor or spindle upon which the rotatable body is mounted. In the case of polishing and grinding wheels the balancing device is inserted over the arbor or spindle upon which the wheel is mounted and is confined and clamped in position between one side of the wheel and one of the usual clamping flanges.

Although it is possible and will be, perhaps, desirable in some cases to retain the balancing device in a counter-balancing position relative to the rotatable body solely by a clamping action against the side thereof, it is particularly advantageous and desirable to fixedly secure a portion of the balancing device, spaced from the axis of rotation, to the side of the rotatable body. In the case of the conventional polishing wheel this may be accomplished by a nail or other such fastening means forced through an aperture in the device and embedded in the side of the wheel.

Having specific reference to the drawing, in Fig. 1 one suitable form of the invention is illustrated. As shown, the balancing device 10 takes the form of a rotatable flat washer-like member, preferably of a relatively heavy metal, which may be cast or die punched or otherwise suitably fabricated. An elongated slot 12 is provided at one end and extends through the intermediate section of the device. In the embodiment shown the mass of the device is concentrated at one end as at 14. An aperture 16 may be provided to receive a nail, or the like, to locate one end of the device against the side of the body to be balanced. The slot 12 is preferably approximately the same width as the diameter of the shaft, spindle or arbor upon which the body to be balanced is mounted. Obviously where the body is provided with a hub, collar or similar structure, the slot 12 will be of a width to receive such structure to locate the same against the side of the body. Although the slot could be extended throughout substantially the length of the device 10, effectiveness and compactness is accomplished by terminating the inner end 18 of the slot 12 at approximately the center of mass of the device.

As shown in Figs. 2 and 3, the balancing device 10 is shown received over the threaded end of the spindle 20 and located between one of the flanges 22 and the inner side of the polishing wheel 24.

These flanges clamp and position the polishing wheel through the tightened nuts 26 in a well known manner. As shown the outer end of the device 10 is fixedly located with reference to the out of balance portion of the wheel by being nailed as at 28 to the side of the wheel.

In balancing the polishing wheel, the heavy or out of balance portion of the wheel is located in any suitable manner. Thus, with the balancing device radially disposed and with the heavy end 14 located diametrically opposite the heavy portion of the wheel, the device is adjusted radially with the slot 12 straddling the bore of the wheel until the balance is effected. The outer end of the device 10 is then nailed to the side of the wheel and with the spindle extending through the slot 12 the device will be permanently retained in balancing position. It will be readily apparent that the balancing device can not fly off even though it may become loosened from the side of the wheel.

Having described my invention in a manner thought to be sufficient to enable those skilled in the art to employ and practice the same, what I claim as new and desire to protect by Letters Patent is:

1. In combination, a rotatable body, means upon which said body is mounted for rotation, a device for balancing said body comprising an elongated unitary member embracing and extending on opposite sides of said means and being capable of radial adjustment to eccentrically position its center of mass to balance said body, and means for affixing said member directly to said body to rotate therewith as a unit.

2. In combination, a rotatable body, means upon which said body is mounted for rotation, a device for balancing said body comprising a member defining an elongated slot within which said means is received, said slot enabling said member to be radially adjusted to eccentrically position its center of mass to balance said body, and a clamping plate for affixing said member directly to said body to rotate therewith as a unit.

3. In combination, a spindle, a rotatable body having a bore through which said spindle is extended, a balancing device comprising a member adjusted to be affixed to the side of said body, means defined in said member straddling said bore and embracing said spindle, said means enabling said member to be radially adjusted to eccentrically position its center of mass to balance said body, and means for securing said member directly to said body to rotate as a unit therewith, said means comprising a clamp and means engaging both said member and said body.

4. In combination, a spindle, a rotatable polishing wheel having a bore through which said spindle is extended, an elongated relatively flat balancing device having an elongated slot defined therein said slot having a greater portion of its extent disposed to one side of the center of mass of said member, said slot straddling said bore and embracing said spindle and enabling said member to be radially adjusted to eccentrically position its center of mass to balance said body, flanges located upon said spindle upon opposite sides of said wheel and means for clamping said wheel and member between said flanges whereby said member is fixedly positioned relative to said wheel and is adapted to rotate therewith as a unit.

5. A balancing device for a rotatable body having a fixed axis of rotation and means extending along the axis of rotation of said body for supporting the same, comprising a relatively flat member, an elongated slot defined by said member adapted to embrace said means to permit radial adjustment relative to said axis and to eccentrically position with reference to said axis the center of mass of said member, and means for affixing said member in direct contact with said body to rotate therewith as a unit.

6. A balancing device for a rotatable body having a fixed axis of rotation and means extending along the axis of rotation of said body for supporting the same, comprising a member, an elongated slot defined by said member adapted to encircle said means to permit radial adjustment relative to said axis, and to eccentrically position with respect to said axis the center of mass of the member, and means for affixing said member in direct contact with said body to rotate therewith as a unit.

7. A balancing device for a rotatable body having a fixed axis of rotation and a portion extending axially along said axis of rotation comprising a relatively flat member having an elongated slot defined therein adapted to receive the portion of the body to permit radial adjustment relative to said axis, said slot being unbalanced in said member with reference to the center of mass thereof.

8. A balancing device of the type described adapted to be affixed to the side of a polishing wheel assembly and the like having a fixed axis of rotation and a portion extending axially along said axis comprising an elongated flat member, a slot defined by said member having the greater portion of its extent disposed on one side of the center of mass of said member, said slot being adapted to receive the axially extending portion of the assembly to permit radial adjustment relative to the axis of rotation.

WILLIAM A. BURGESS.